United States Patent [19]

Rohs

[11] Patent Number: 5,762,577
[45] Date of Patent: Jun. 9, 1998

[54] TORSIONAL VIBRATION DAMPER

[75] Inventor: Ulrich Rohs, Düren, Germany

[73] Assignee: Patentverwertungsgesellschaft Rohs Voight mbH, Düren, Germany

[21] Appl. No.: 756,062

[22] Filed: Nov. 25, 1996

[51] Int. Cl.$^6$ ................................. F16H 57/10
[52] U.S. Cl. ........................ 475/95; 475/108; 74/574
[58] Field of Search .................. 475/95, 96, 108, 475/112; 74/574

[56] References Cited

U.S. PATENT DOCUMENTS

| 3,180,182 | 4/1965 | Tiberio | 475/95 |
| 3,854,348 | 12/1974 | Stevenson | 475/96 |
| 4,322,988 | 4/1982 | Hill | 475/108 X |
| 4,905,807 | 3/1990 | Rohs et al. | 74/574 X |
| 4,943,268 | 7/1990 | Eisenmann et al. | 475/95 |
| 5,145,043 | 9/1992 | Kuo | 475/95 X |
| 5,496,224 | 3/1996 | Rohs et al. | 475/95 X |

FOREIGN PATENT DOCUMENTS

| 27 51 151 | 10/1979 | Germany . |
| 32 27 809 | 1/1984 | Germany . |
| 58-165672 | 9/1983 | Japan . |

*Primary Examiner*—Charles A. Marmor
*Assistant Examiner*—Peter T. Kwon
*Attorney, Agent, or Firm*—Collard & Roe, P.C.

[57] ABSTRACT

A hydraulic torsional vibration damper comprising a primary part having an internal gear and a driving gear rim, a secondary part, and a planetary support having a hub and supported by said secondary part. A plurality of planetary gears are arranged in said planetary support and engage the internal gear of the primary part to form gear pumps for pumping a hydraulic medium. A plurality of suction chambers are arranged in the planetary support, each suction chambers having an inner and an outer wall. A ring-shaped pressure chamber is arranged between the hub of the planetary support and the planetary gears and is connected to the planetary gears. The pressure chamber is also controllably connected to the suction chambers.

5 Claims, 4 Drawing Sheets

TORSIONAL VIBRATION DAMPER

BACKGROUND OF THE INVENTION

1. Field of the Invention

The invention relates to a hydraulic torsional vibration damper having a primary part with an internal gear. The primary part supports a driving gear rim and a secondary part supports a planetary support.

2. The Prior Art

Such a torsional vibration damper is described in DE 43 18 165 C1. With this and similar torsional vibration dampers, undesirable leakage may occur on the inner seals due to deformation of the rotating parts.

SUMMARY OF THE INVENTION

It is therefore an object of the present invention to overcome the drawbacks of the prior art to avoid such leakage and to increase the efficiency of the vibration damper.

The present invention accomplishes this with a hydraulic torsional vibration damper comprising a primary part having an internal gear and a driving gear rim, a secondary part, and a planetary support having a hub and supported by said secondary part. A plurality of planetary gears are arranged in a planetary support and engage the internal gear of the primary portion to form gear pumps for pumping a hydraulic medium. A plurality of suction chambers are arranged in the planetary support, each suction chamber having an inner and an outer wall. A ring-shaped pressure chamber is arranged between the hub of the planetary support and the planetary gears and is connected to the planetary gears. The pressure chamber is also controllably connected to the suction chambers.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

DETAILED DESCRIPTION OF THE PREFERRED EMBODIMENTS$

Figure 1:
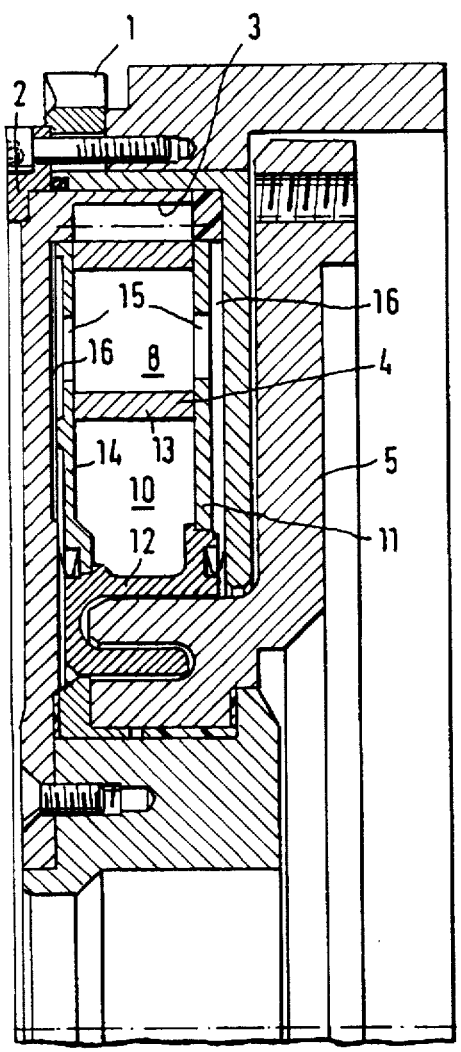
FIG. 1 is a partially-longitudinal sectional view through a torsional vibration damper according to the invention, along line I—I in FIG. 3.

Referring now in detail to the drawings and, in particular, FIG. 1, the torsional vibration damper consists of a primary part 2 with an internal gear 3. The primary part supports a driving gear rim 1. A secondary part 5 supports a planetary support 4. A plurality of planetary gears 6 are supported in planetary support 4. In this embodiment, the planetary gears are received without axles in matching partly-cylindrical recesses 7.

Planetary gears 6 engage internal gear 3 to form a plurality of gear pumps. Suction chamber 8 is arranged between planetary gears 6 in planetary support 4. Chamber a is connected via a control valve 9 with a ring-shaped pressure chamber 10 for a hydraulic medium. Chamber 10 is accommodated in planetary support 4 at the radially inner end of planetary support 4.

Figure 2:
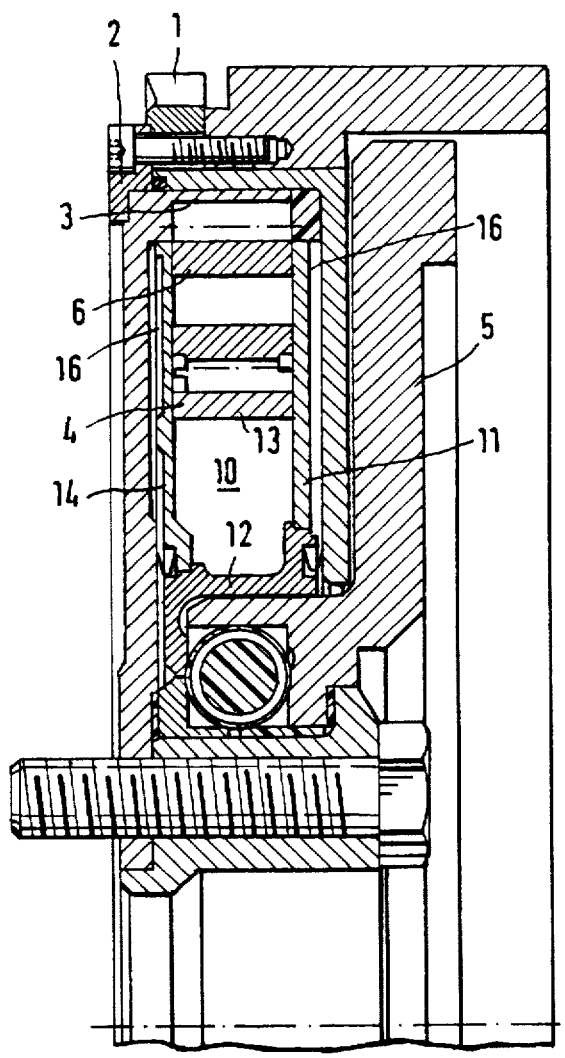
FIG. 2 is a partially-longitudinal sectional view through the torsional vibration damper of FIG. 1, along line II—II in FIG. 3.

As shown in FIGS. 1 and 2, pressure chamber 10 is enclosed by back wall 11 and hub 12, as well as by radially outer limitation wall 13 of planetary support 4, in which planetary gears are supported. In order to seal the pressure chamber completely tight, face wall 14 is tightly resting and mounted on pressure chamber 10. Face wall 14 has apertures 15 leading to suction chambers 8. In this way, gap spaces 16, which are disposed axially in front of and behind pressure space 10 are included in the zone of suction chambers 8 and, jointly with the chambers, form the suction part.

Planetary gears 6 are connected with suction chambers 8 via suction ducts 17, and with pressure chamber 10 via pressure ducts 19, which feed into chamber 10.

Figure 3:
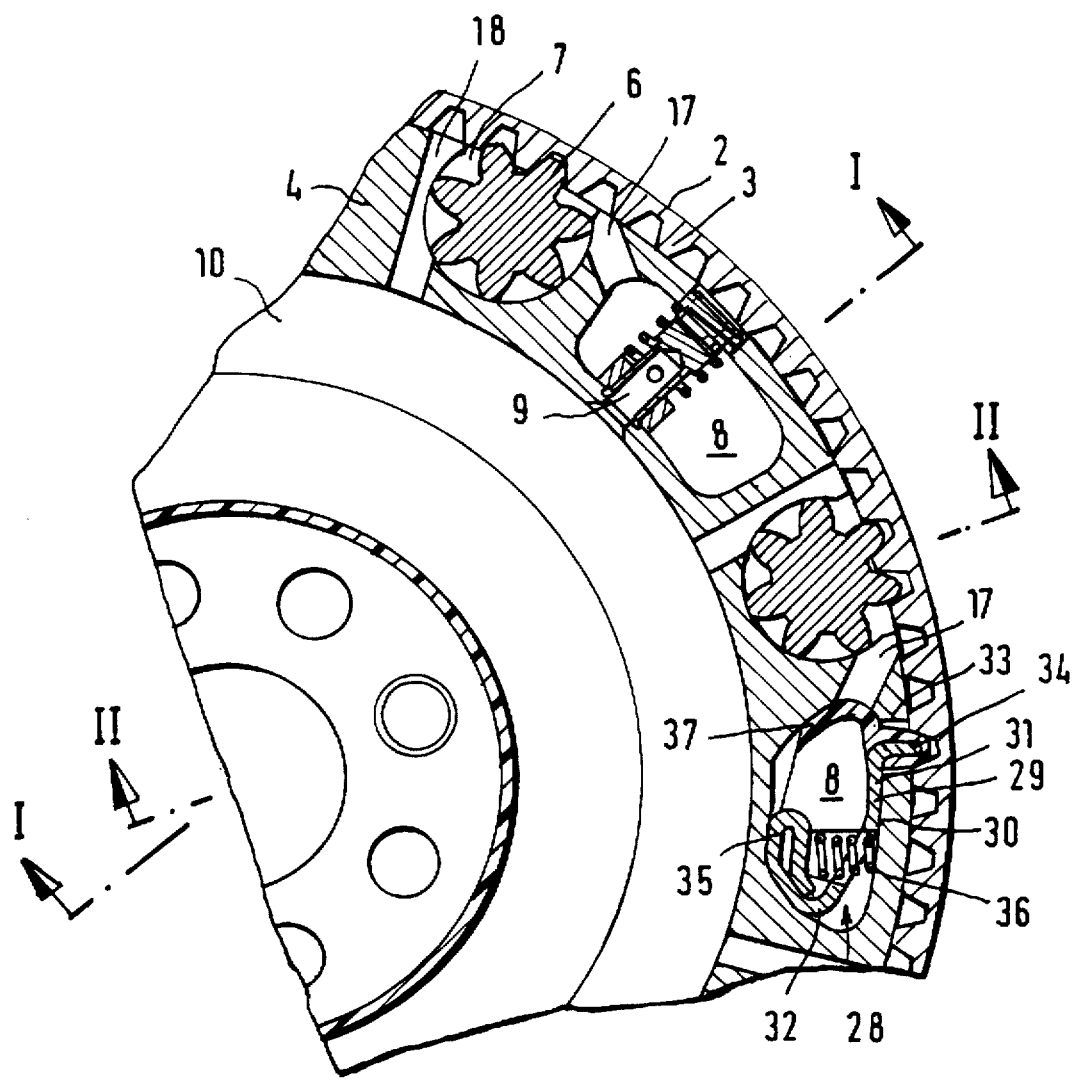
FIG. 3 is a partial cross-sectional view through the torsional vibration damper according to the invention, in the resting position.
Figure 4:
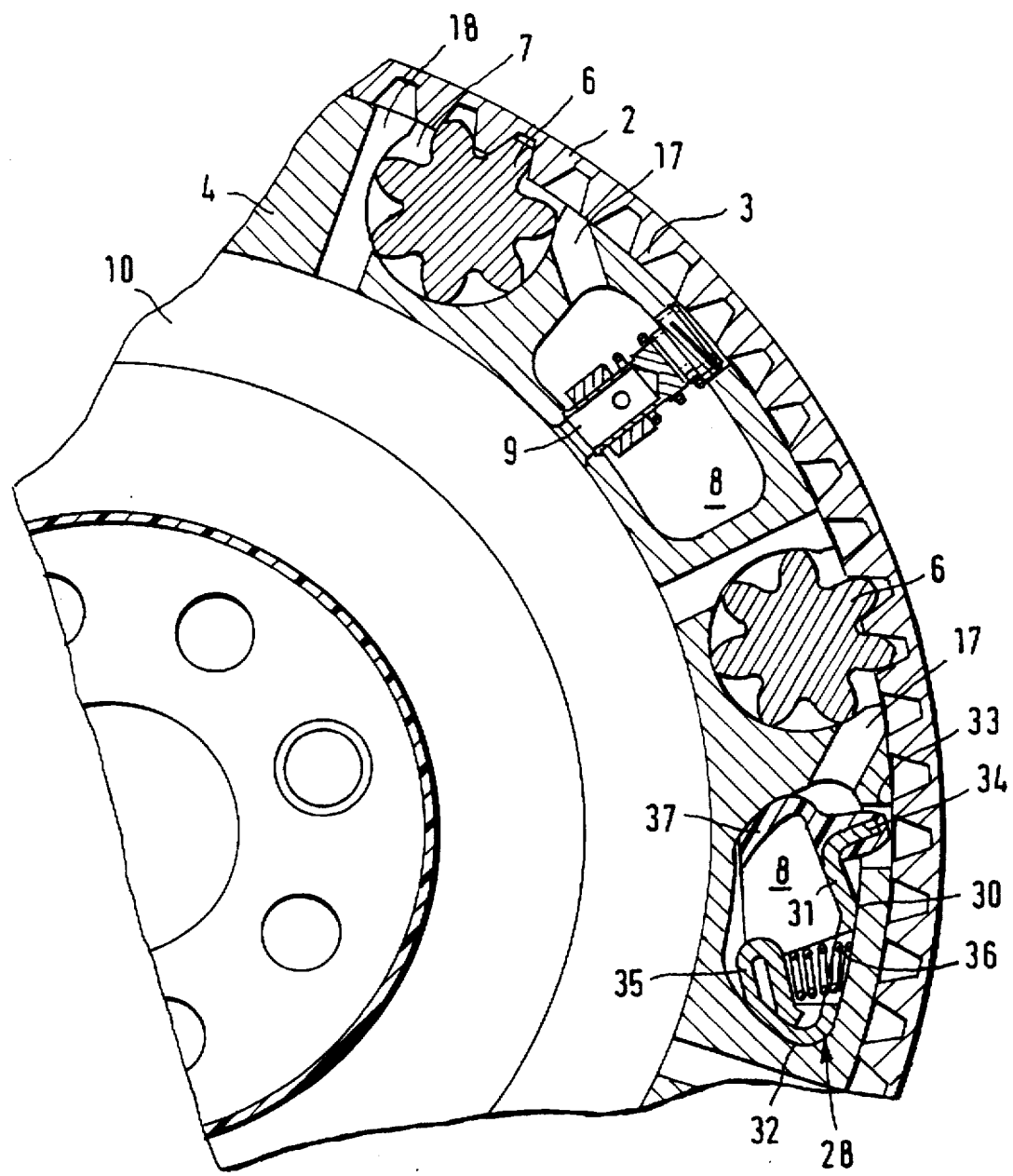
FIG. 4 is a partial cross-sectional view through the torsional vibration damper at high numbers of revolution.
Figure 5:
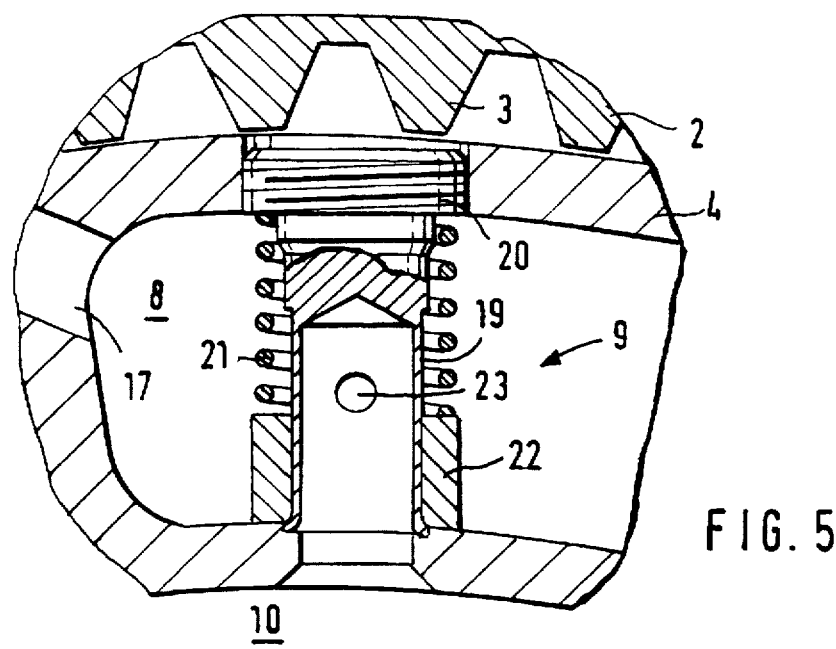
FIG. 5 is a control valve from FIG. 3 in an enlarged scale.

A control valve 9 is connected with pressure chamber 10 in each of suction chambers 8. As shown in FIGS. 3 to 5, control valve 9 consists of a radial, outwardly closed tube 19. Outwardly closed tube 19 is directly connected with pressure chamber 10 and has a flange 20 at its radial outer end. Flange 20 serves as a seat for a reset spring 21, by which a cylindrical bushing guided on tube 19 is pressed radially inward. Slightly outside the upper edge of the bushing, in the resting position shown in FIG. 5, at least one outlet aperture 23 is present in tube 19. The aperture connects suction chamber 9 with pressure chamber 10.

At a higher number of revolutions where the damping requirement is lower, the centrifugal force drives cylindrical bushing 22 radially outwardly across tube 19, outlet aperture 23 is thereby closed so that no further additional damping medium is received in suction chamber 8 from pressure chamber 10. FIG. 4 shows the control valve in the position at a higher number of revolutions. In this position, cylindrical bushing 22 covers outlet aperture 23.

Figure 6:
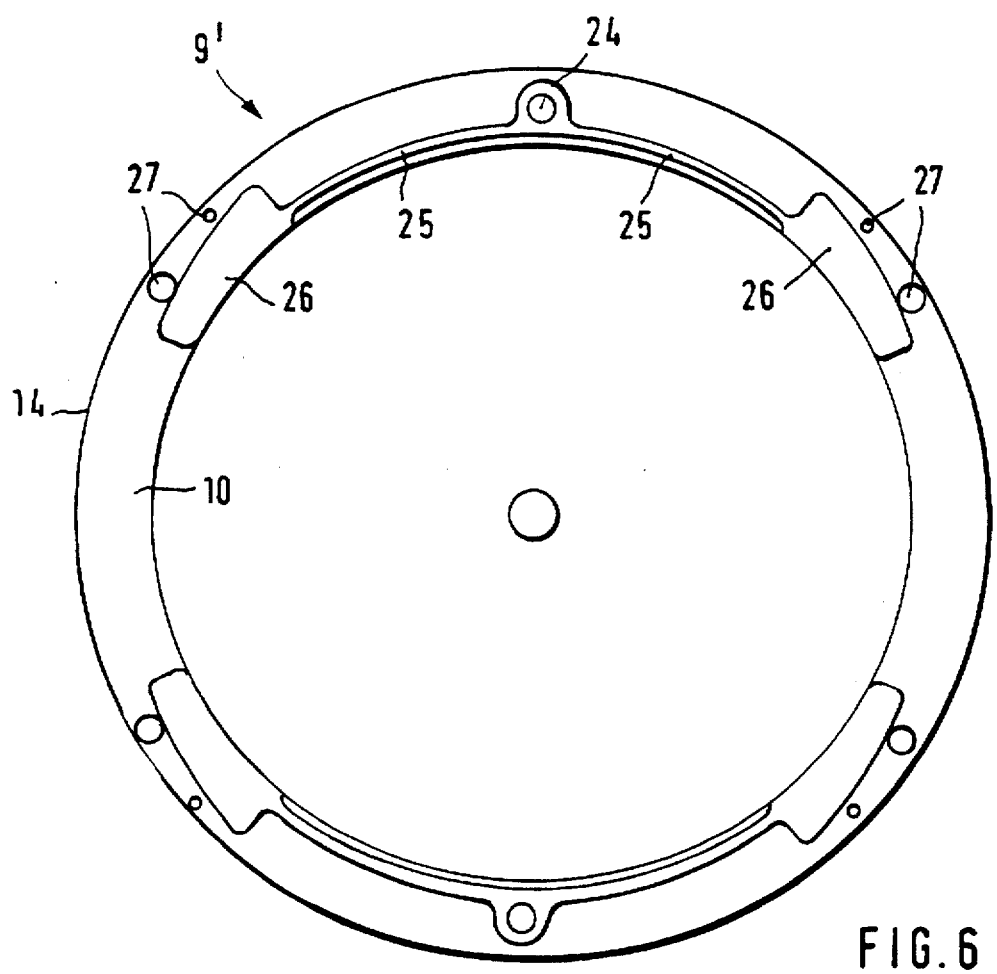
FIG. 6 is a schematic view of another control valve.

An alternative to control valve 9 is schematically shown in FIG. 6, which shows a side wall 14 of pressure chamber 10 with at least one support 24 for a control valve 9' made of sheet metal. Valve 9' forms a double-arm lever which forms part of a circular arc. Lever arms 25 have at each end a closing disk 26 tightly resting on side wall 14. At least one outlet aperture 27 is arranged radially outside of closing disk 26 (in their resting positions), in side wall 14 of pressure chamber 10 leading to gap space 16 and thus to the suction part.

The centrifugal force at high revolution speeds causes closing disks 26 to move outwardly and to close the outlet apertures.

Both control elements 9 and 9' achieve flow-through of damping medium in a high quantity at low revolution speeds, when the damping requirement is high. Control elements 9 and 9' also reduce-the flow-through in favor of superior efficiency at higher revolution speeds, when the damping requirement is lower.

FIGS. 3 and 4 show a creep lock 28. Creep lock 28 prevents relative motion between primary part 2 and planetary support 4 in the resting position. Creep lock 28 is arranged in suction chamber 8 in planetary support 4 and comprises a bent leaf spring body 29. Bent leaf spring body 29 forms a double-arm lever by bend 30 with lever arms 31 and 32. Left lever arm 31 rests against the wall portion of suction chamber 8 facing suction duct 17 and supports a locking tooth 34 projecting radially outwardly through an opening 33 in suction chamber 8. In the resting position, locking tooth 34 engages a tooth gap of internal gear 3. The other lever arm 32, due to bend 30, rests against the inner end of suction chamber 8, where it is coiled to form a mass 35. Mass 35 is supported by reset spring 36, which in turn is supported by the wall of suction chamber 8.

When the engine is started, planetary support 4 with primary part 2 rotates until the centrifugal force of mass 35 overcomes the force of reset spring 36 and swings around leaf spring body 29 on bend 30, thus disengaging tooth 34, as seen in FIG. 4.

Preferably, locking tooth 34 has a plastic covering 37, which can also form the end of lever arm 31 remote from locking tooth 34.

Accordingly, while only a few embodiments of the present invention have been shown and described, it is obvious that many changes and modifications may be made thereunto without departing from the spirit and scope of the invention.

What is claimed is:

1. A hydraulic torsional vibration damper, comprising:

a primary part having an internal gear and a driving gear rim;

a secondary part;

a planetary support having a hub and supported by said secondary part;

a plurality of planetary gears arranged in said planetary support, said planetary gears engaging the internal gear of the primary part and forming gear pumps for pumping a hydraulic medium;

a plurality of suction chambers arranged in said planetary support, each of said suction chambers having an inner and an outer wall;

a ring-shaped pressure chamber arranged between the hub of the planetary support and the planetary gears, wherein the planetary support has lateral face walls that enclose the pressure chamber and wherein the pressure chamber is connected to the planetary gears; and means for creating a controllable connection between said pressure chamber and said suction chambers.

2. A hydraulic torsional vibration damper according to claim 1, wherein the means for creating a controllable connection between said pressure chamber and said suction chambers comprises:

a outwardly closed tube arranged in the radial direction in each suction chamber, said tube having an outlet aperture opening into the suction chamber and being connected to said pressure chamber; and a cylindrical bushing surrounding the radial inward portion of said tube, wherein at high revolution speeds of the vibration damper, the bushing moves radially outwardly and closes the outlet aperture.

3. A hydraulic torsional vibration damper of claim 1, wherein the means for creating a controllable connection between the pressure chamber and said suction chambers comprises:

at least one double-arm elastic lever arranged in said pressure chamber and supported by at least one face wall, said lever extending along a circumferential line and having two ends, a closing disk arranged on each one of said ends, each disk resting flatly against one face wall; and a plurality of connection openings arranged along the one face wall radially outwardly from each of said closing disks, said opening connecting the pressure chamber with the suction chambers, wherein at high revolution speeds the closing disks move radially outwardly and close the connection openings.

4. A hydraulic torsional vibration damper according to claim 1, further comprising:

a creep lock arranged in at least one suction chamber, said creep lock comprising a bent leaf spring body having a bend that forms a double arm lever, each one of the arms having an end, wherein one of the arms of the lever rests against the outer wall of the suction chamber;

an aperture in said outer wall;

a gear tooth arranged on the lever arm that rests against the outer wall, said tooth projecting through said aperture and engaging the internal gear of the primary part;

a mass arranged on the end of the other lever arm;

a radial reset spring arranged on the outer wall of the suction chamber, said radial reset spring supporting said mass, wherein at high revolution speeds the mass moves radially outwardly against the reset spring and disengages the tooth from the internal gear.

5. A hydraulic torsional vibration damper according to claim 4, further comprising a plastic coating covering the locking tooth and forming the end of the lever arm remote from the tooth.

* * * * *